Patented Feb. 12, 1952

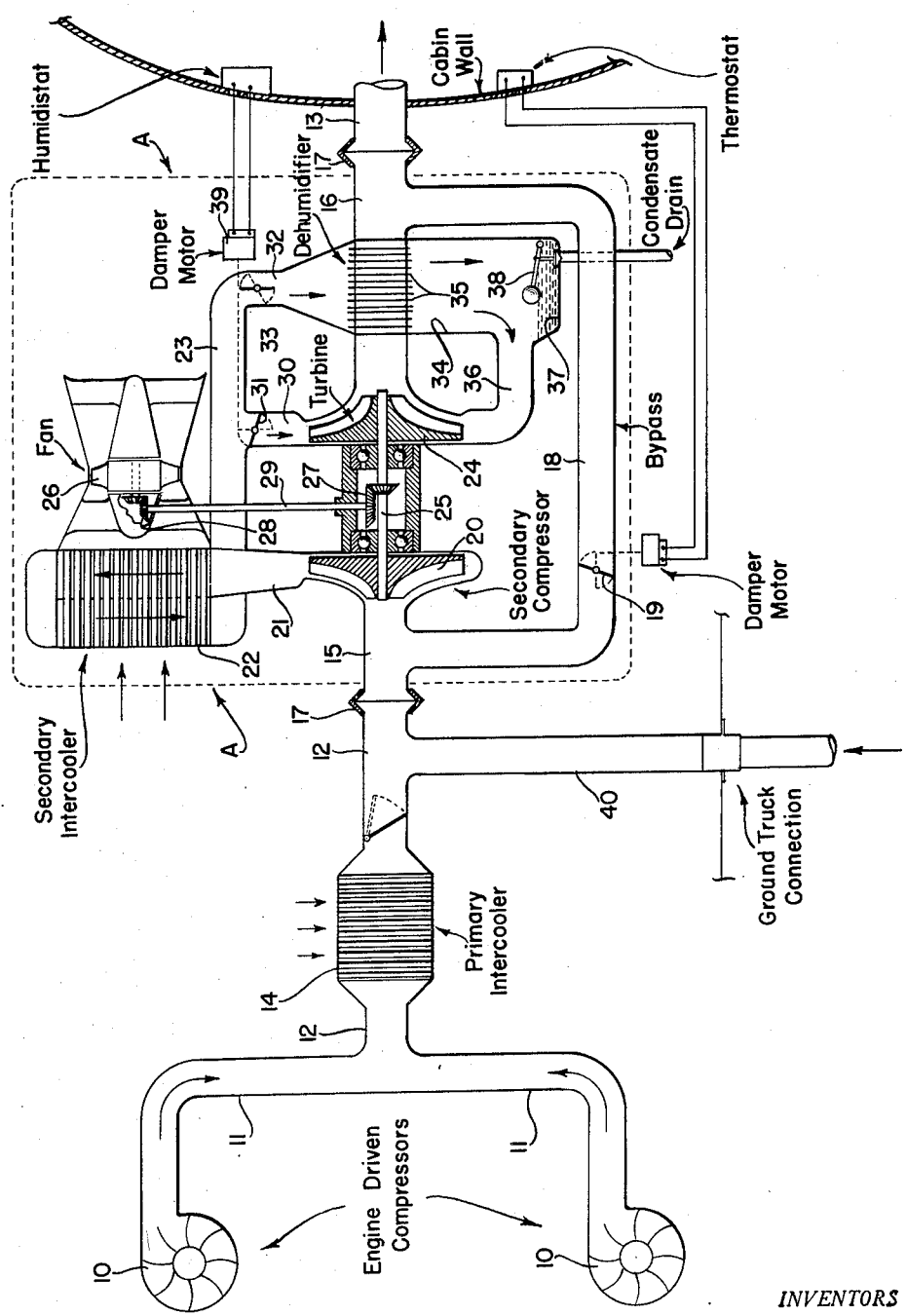

2,585,570

UNITED STATES PATENT OFFICE 2,585,570

AIRCRAFT PRESSURIZING AND COOLING SYSTEM

Bernard L. Messinger, Los Angeles, and Howard M. Cousins, Tujunga, Calif., assignors to Lockheed Aircraft Corporation, Burbank, Calif.

Application July 29, 1946, Serial No. 686,880

7 Claims. (Cl. 62—137)

This invention relates to an improved aircraft compartment pressurizing system embodying provision for cooling and dehumidification of the air supplied to the compartment to maintain comfortable cabin conditions, either on the ground or at positive pressure differentials above atmospheric pressure when operating in the rarified air of high altitudes.

The need of refrigeration and humidity control in airplane pressurizing systems arises from several factors. An airplane may have to spend as much as one-half an hour in engine run-ups, taxiing, and awaiting control tower clearance for take-off. On a hot summer day the resulting temperatures in an airplane cabin become almost unbearable, because the cumulative humidity derived from the passengers is added to the discomfort from heat absorbed by the airplane skin, as well as that generated by electrical and other equipment carried by the airplane. In flight another source of heat is found in the boundary layer kinetic energy, and that evolved by stopping the air drawn into the pressurizing system, this adding as much as six degrees to the cabin temperature during climbs, and up to fifteen to twenty degrees in level flight. It has been found under such conditions that even adequate ventilation will not keep the temperature within the cabin down to within ten degrees of the outside temperature. In high-speed fighter aircraft, temperature increases of fifty to sixty degrees Fahrenheit have been recorded. For these reasons a cabin without refrigeration would run a temperature of eighty-five to ninety-five degrees Fahrenheit at 7000 feet altitude on a summer day, and a still higher figure would result at lower altitudes. It is accordingly an important object of this invention to provide an improved, simplified and self-contained air cycle refrigerating system for the purposes mentioned wherein the system derives its power from the air compression system required to pressurize the aircraft at high altitudes. To this end, we extract energy from the compressed air, taking the heat equivalent of the energy out of the air by means of an air turbine driving both a secondary compressor, to increase the available pressure drop for the turbine, and a fan for cooling a secondary intercooler for further cooling the air heated by the secondary compressor. In practice, we have been able to take approximately sixty-five horsepower of energy out of the turbine against a maximum power requirement of approximately ninety-five horsepower at the primary compressors of the pressurizing system, the initial air temperature being 110° Fahrenheit and the resulting delivered temperature, 40° Fahrenheit, with a half a pound of moisture per minute being removed.

It is a further important object of this invention to provide for humidity control in connection with such an air cycle refrigeration system for the conditioning of the air in a pressurized airplane compartment by providing a dehumidifier to remove condensate from the air during the refrigeration cycle.

It is another important object of this invention to provide a package or self-contained refrigeration and dehumidification system of the type disclosed responsive to remote cabin pressure temperature and humidity controls and removable and insertable as a unit in the cabin pressurizing system.

It is a further important object of this invention to provide an improved and simplified air cycle refrigeration and dehumidification system wherein the desired cabin pressure, temperature, and humidity are obtainable by variably by-passing elements of the system.

Other objects and features of the invention will be readily understood from the following detailed description of a typical preferred form of the invention wherein reference will be made to the accompanying drawings in which a schematic sketch of a refrigerating and dehumidifying system embodying the features of this invention is shown associated with a cabin pressurizing system for supplying compressed air to an airplane cabin or compartment.

As shown on the drawing, a pair of primary compressors 10, which may be driven by the main airplane power plants (not shown), compress ambient air to double its initial pressure, i. e., with a compression ratio of two to one. As disclosed in the Price Patent No. 2,342,220, a cabin pressurizing system suitable for our purposes uses such compressors controlled to deliver a substantially constant weight of air at all altitudes within the airplane operating range, and this air supply has its pressure doubled. The actual cabin pressure is controlled by venting air from the cabin, and at ground level no positive pressure is desired, so that under such circumstances the compressors merely supply ventilating air and the entire compression pressure is available when desired for maximum refrigerating effect.

The compressors 10 are connected by ducts 11 to a common duct 12, which in the Price cabin pressurizing system would lead to a duct 13 discharging into the airplane cabin. Since the compressors add considerable heat to the ambient air, one or more primary intercoolers 14 are provided in the ducts 11 or 12 which, when the airplane is in flight is cooled by ram air taken from and returned to the surrounding atmosphere. In practice, the compressors are located in engine nacelles on each wing, so it is convenient to locate the primary intercoolers adjacent thereto, but as an alternative, the discharge from one compressor may be carried over to the other wing and a common intercooler in that wing used in the duct 12 for both compressors, as shown herein for the sake of simplicity.

The air cycle refrigeration and dehumidification apparatus of this invention is conveniently formed as a self-contained assembly indicated by the broken line A removable as a unit by connecting the duct 12 to an air inlet duct 15 and the duct 13 to an air outlet duct 16 in the assembly, suitable detachable connections being indicated at 17. The ducts 15 and 16 are connected by a by-pass duct 18, which is variably opened to decrease or eliminate the refrigeration effect in response to the cabin temperature control. When the entire refrigeration unit is removed from the airplane, as during the winter season, the duct 12 is directly connected to the duct 13 by a duct substituted for the by-pass duct 18.

Assuming that the by-pass duct 18 is closed by its damper 19, the entire flow of air from the compressors 10 is delivered to a secondary compressor 20, which further compresses the air at a 1.6 to one ratio to produce an approximate overall compression ratio of 3.2 to one. The further compression again increases the temperature of the air, which is delivered through a duct 21 to a secondary intercooler 22 and thence into a duct 23. From the duct 23 the air flows through two possible paths to an air turbine 24, which by extracting energy from the air in expanding the same to a lower pressure, extracts the heat equivalent of the work performed by the turbine. The turbine is loaded by connecting it to the secondary compressor by a shaft 25, and a fan 26 is also driven therefrom by gearing 27, 28, and a shaft 29, the fan serving to draw cooling air through the secondary intercooler, an advantage when the airplane is motionless and therefore does not generate a ram effect to produce cooling air flow.

The air flow from the duct 23 to the turbine 24 may be direct, through a duct 30 controlled by a damper 31, or may be by-passed through a duct 32 controlled by a damper 33, to a dehumidifier chamber 34 where the air passes over a finned area 35 of the duct 16 and is thereby cooled by the refrigerated air in that duct. After passing over the finned area of the duct, the air is delivered to the turbine through a duct 36. If the air in the dehumidifier is cooled below its dew point, water will condense therefrom and collect at 37 in the bottom of the chamber 34, whence it is drained overboard through float valve 38 and a tube. By so removing excess water from the air, the expansion and cooling effect of the turbine will not cause excessive humidity in the air delivered to the cabin. The two dampers 31 and 33 may be interconnected to a damper motor 39 under the remote control of a humidity control device within the cabin; commercially available examples of which are called "humidostats."

It will be noted that the full refrigeration load demand occurs only on the ground and in hot summer weather, in which case the entire two-stage compression pressure is available for the refrigeration cycle. Under normal pressurized flight conditions, only a portion of the available refrigeration effect is necessary, permitting a proportionally higher back pressure on the turbine, as well as involving a mixing or dilution of the cold air by air flowing through the by-pass 18.

Both temperature and humidity controls are responsive to conditions in the pressurized cabin itself, which conditions are modified by the heat and moisture given off by the occupants, and by partial recirculation of the cabin air. Accordingly, it may not be necessary to fully dehumidify the air supply in such case, as even excessive moisture at the delivery temperature of the turbine will be re-evaporated at the point of mixture with the recirculating air, further abstracting sensible heat from the recirculated cabin air.

Since the refrigeration and dehumidification system is self-contained and derives its power from the compressed air delivered by the primary or engine driven compressors, it is simple to provide for ground operation of the system when the airplane engines are shut down as all that is required is an adequate supply of compressed air at a gauge pressure of approximately fifteen pounds. Such an air supply can be provided by a ground truck carrying an air compressor which can be connected into the system by a branch duct 40.

In a prototype installation for adding refrigeration to the cabin pressurizing system of the Lockheed Constellation, the two engine driven compressors, which together are normally controlled to deliver fifty pounds of air at double the atmospheric pressure, requiring 36 horsepower under sea level conditions, under refrigerating conditions are over-controlled to deliver one hundred pounds of air, then absorbing 96 horsepower. Accordingly, the refrigerating load represents an added 60 horsepower at the same pressure ratio of two to one, which serves to produce refrigeration equivalent to a ten ton commercial rating.

Under these conditions the air leaving the primary compressors has a temperature of approximately 275° Fahrenheit, and the primary intercooler brings this temperature down to approximately 156° F. at the entrance to the turbine driven secondary compressor. The secondary compressor adds a pressure ratio of 1.6, delivery air through the secondary intercooler to the turbine at a pressure ratio of 3.2 relative to atmosphere, and a temperature of 126° F., the turbine reducing the pressure to slightly above atmospheric at a temperature of 0° F. on a dry air basis, or 42° F. without dehumidification. The heat equivalent of the 65 horsepower absorbed by the turbine thus reduces the air temperature by approximately 126° F.

In the foregoing description, the pressure ratios have been given instead of gauge pressures as the maximum load on the refrigerating system will be at ground or sea level altitude at which no cabin pressurization is desired. As the altitude increases, the compressor pressure ratios remain constant, but the gauge pressures decrease in proportion to the atmospheric pressure, and the pressure drop through the turbine decreases both because of the lower pressures available, and because the cabin pressure differential calls for a higher pressure at the turbine discharge with respect to the ambient pressure. As the altitude increases, the refrigeration demand decreases except for the heating effect of the relative speed of the airplane, which produces a temperature rise of as much as 20° F. due to the ram effect of entrained air and boundary layer kinetic energy converted into heat.

When the airplane cabin is not being pressurized, the entire compressor power requirements are chargeable to the refrigeration equipment, since the standby period prior to take-off represents maximum demand for refrigeration. Even in hot weather the refrigeration demand tapers off as the airplane ascends, and may be entirely by-passed at normal pressurized flight altitudes prior to, or at which time the primary compressors are returned to their normal load and delivery requirements. As the refrigeration demand, regulated by cabin temperature controls, tapers off, the first phase in the control sequence returns the primary supercharges to their normal rating, and as the refrigeration load further decreases, the by-pass around the refrigeration system progressively opens. In the winter season the entire refrigeration unit can be removed and replaced by a through duct in order to increase the airplane pay load by an equivalent weight of cargo.

It will thus be seen that we have invented an improved and self-contained air cycle refrigerating and humidity control apparatus systems without requiring external power sources for the operation thereof.

Having described only a typical form of the invention, we do not wish to be limited to the specific details herein set forth, but wish to reserve to ourselves any variations or modifications that may appear to those skilled in the art and/or fall within the scope of the following claims.

We claim:

1. In a cabin pressurizing system for aircraft including at least one primary compressor taking air from the atmosphere and delivering compressed air to the airplane cabin through a duct, and at least one primary intercooler associated with said duct, the combination of an air cycle refrigerating system interposed in said duct, comprising a secondary compressor, a secondary intercooler, and an expansion turbine arranged in ducted sequence relative to said cabin duct, a by-pass duct between said secondary intercooler and said expansion turbine, and a condenser in said by-pass duct in heat exchanging relationship with the outlet of said expansion turbine whereby to dehumidify the air prior to delivery to said expansion turbine.

2. In a cabin pressurizing system for aircraft including at least one primary compressor taking air from the atmosphere and delivering compressed air to the airplane cabin through a duct, and at least one primary intercooler associated with said duct, the combination of an air cycle refrigerating system interposed in said duct, comprising a secondary compressor, a secondary intercooler, and an expansion turbine arranged in ducted sequence relative to said cabin duct, a by-pass duct between said secondary intercooler and said expansion turbine, a condenser in said by-pass duct in heat exchanging relationship with the outlet of said expansion turbine whereby to dehumidify the air prior to delivery to said expansion turbine, and means for controlling the flow through said by-pass duct.

3. In a cabin pressurizing and refrigerating system for aircraft, the combination in ducted sequence of a primary compressor taking air from the atmosphere, a primary intercooler for cooling the air delivered by said compressor, a secondary compressor for further increasing the pressure of the air leaving said intercooler, a secondary intercooler for removing the heat of compression imparted by said secondary compressor, an expansion turbine, means for driving said secondary compressor from said expansion turbine, a by-pass duct between said secondary intercooler and said expansion turbine, and a condenser in said by-pass duct in heat exchanging relationship with the outlet of said expansion turbine whereby to dehumidify the air prior to delivery to said expansion turbine.

4. In a cabin pressurizing and refrigerating system for aircraft, means for supplying compressed air to said cabin, and refrigerating means for cooling said compressed air, comprising an expansion turbine adapted to extract the heat equivalent of the work done thereby from said compressed air, means for loading said expansion turbine, and means for removing excess moisture from the air supplied to said turbine including a condenser in heat exchanging relationship with the air discharged from said expansion turbine.

5. In a cabin pressurizing and refrigerating system for aircraft, means for supplying compressed air to said cabin and refrigerating means for cooling said compressed air, comprising an expansion turbine adapted to extract the heat equivalent of the work done thereby from said compressed air, an externally cooled heat exchanger adapted to precool the compressed air prior to entry to the expansion turbine, means for loading said expansion turbine, and means for removing excess moisture from the air supplied to said turbine including a condenser in heat exchanging relationship with the air discharged from said expansion turbine.

6. In a cabin pressurizing and refrigeration system for aircraft, the combination of a duct supplying air to said cabin, a power driven air compressor in said duct, a second compressor in series with said power driven compressor, an intercooler disposed between said compressors, an expansion turbine also in series with said compressors, means for driving said second compressor from said expansion turbine, a fan for circulating cooling air through said intercooler, means for driving said fan from said expansion turbine, and means for extracting excess moisture from the duct supplying air to the cabin.

7. In a cabin pressurizing and refrigeration system for aircraft, the combination of a duct supplying air to said cabin, a power driven air compressor in said duct, a second compressor in series with said power driven compressor, an expansion turbine also in series with said compressors, duct means by-passing said second compressor and said turbine, means for driving said second compressor from said expansion turbine, and means for extracting excess moisture from the duct supplying air to the cabin.

BERNARD L. MESSINGER.
HOWARD M. COUSINS.

REFERENCES CITED

The following references are of record in the file of this patent:

UNITED STATES PATENTS

| Number | Name | Date |
|---|---|---|
| 2,077,315 | Ewing | Apr. 13, 1937 |
| 2,174,584 | Imus | Oct. 3, 1939 |
| 2,391,838 | Kleinhans | Dec. 25, 1945 |
| 2,473,496 | Mayer | June 14, 1949 |
| 2,474,441 | Sparrow | June 28, 1949 |
| 2,485,522 | Andersen | Oct. 18, 1949 |